United States Patent
Sakata et al.

(10) Patent No.: US 8,859,634 B2
(45) Date of Patent: Oct. 14, 2014

(54) ADHERENT RESIN COMPOSITION

(75) Inventors: Junji Sakata, Tokyo (JP); Hajime Kitano, Tokyo (JP); Hiroyuki Kanesugi, Tokyo (JP)

(73) Assignee: BRIDGESTONE Corporation, Tokyo (JP)

( * ) Notice: Subject to any disclaimer, the term of this patent is extended or adjusted under 35 U.S.C. 154(b) by 598 days.

(21) Appl. No.: 12/810,996

(22) PCT Filed: Dec. 9, 2008

(86) PCT No.: PCT/JP2008/072332
§ 371 (c)(1),
(2), (4) Date: Jun. 28, 2010

(87) PCT Pub. No.: WO2009/084386
PCT Pub. Date: Jul. 9, 2009

(65) Prior Publication Data
US 2010/0286301 A1  Nov. 11, 2010

(30) Foreign Application Priority Data

Dec. 27, 2007 (JP) ................................ 2007-337285
Dec. 27, 2007 (JP) ................................ 2007-337291
Aug. 20, 2008 (JP) ................................ 2008-211853
Sep. 24, 2008 (JP) ................................ 2008-244771

(51) Int. Cl.
| | |
|---|---|
| *C08F 2/46* | (2006.01) |
| *C08J 3/28* | (2006.01) |
| *C09J 175/16* | (2006.01) |
| *C08G 18/67* | (2006.01) |
| *C08F 290/06* | (2006.01) |
| *C08F 283/00* | (2006.01) |
| *C09J 133/14* | (2006.01) |
| *C09J 4/00* | (2006.01) |

(52) U.S. Cl.
CPC ........... *C08F 283/006* (2013.01); *C09J 175/16* (2013.01); *C08G 18/672* (2013.01); *C08F 290/067* (2013.01); *C09J 133/14* (2013.01); *C09J 4/00* (2013.01)
USPC ................. 522/97; 522/90; 522/96; 522/113; 522/114; 522/120; 522/150; 522/152; 522/173; 522/174

(58) Field of Classification Search
USPC ............... 522/90, 96, 97, 113, 114, 120, 150, 522/152, 173, 174
See application file for complete search history.

(56) References Cited

U.S. PATENT DOCUMENTS

| | | | |
|---|---|---|---|
| 6,191,187 B1* | 2/2001 | Yamamura et al. | 522/96 |
| 6,562,881 B2* | 5/2003 | Jacobine et al. | 522/96 |
| 7,660,427 B2* | 2/2010 | Litke et al. | 381/322 |
| 8,169,707 B2* | 5/2012 | Nakamura et al. | 359/620 |
| 2003/0119934 A1 | 6/2003 | Hu | |

FOREIGN PATENT DOCUMENTS

| | | | |
|---|---|---|---|
| JP | 07-310067 A | | 11/1995 |
| JP | 08-143635 A | | 6/1996 |
| JP | 08143635 A | * | 6/1996 |
| JP | 10-036809 A | | 2/1998 |
| JP | 10-239840 A | | 9/1998 |
| JP | 2001200024 A | * | 7/2001 |
| JP | 2002-062645 A | | 2/2002 |
| JP | 2002-214779 A | | 7/2002 |
| JP | 2004-115757 A | | 4/2004 |
| JP | 2004210617 A | * | 7/2004 |
| JP | 2005-255844 A | | 9/2005 |
| JP | 2007-237698 A | | 9/2007 |
| JP | 2006-184538 A | | 8/2008 |
| WO | 2006/025733 A1 | | 3/2006 |
| WO | WO 2008117854 A1 | * | 10/2008 |
| WO | WO 2010008174 A2 | * | 1/2010 |

OTHER PUBLICATIONS

Art-Resin Product Specifications from Negami Chemical Industrial Co.Ltd. [onilne]. retrieved on [Feb. 24, 2013]. retrieved from <URL// http://www.negamikogyo.co.jp/english/solution/artrejin.html>.*
Office Action issued Feb. 22, 2012, in Chinese Patent Application No. 200880126693.1 with English translation.
Japanese Office Action issued in corresponding JP Application No. 2008-244771, dated Jun. 4, 2013.
Japanese Office Action issued in corresponding JP Application No. 2008-211853, dated Jun. 4, 2013.
Japanese Office Action issued in corresponding JP Application No. 2007-337291, dated Jun. 4, 2013.
Japanese Office Action issued in corresponding JP Application No. 2008-244771, dated Aug. 27, 2013.
Japanese Office Action issued in corresponding JP Application No. 2008-211853, dated Aug. 27, 2013.
Japanese Office Action issued in corresponding JP Application No. 2007-337291, dated Aug. 27, 2013.

\* cited by examiner

*Primary Examiner* — Sanza McClendon
(74) *Attorney, Agent, or Firm* — Sughrue Mion, PLLC

(57) ABSTRACT

This invention relates to a photo-curing or electron beam-curing adherent resin composition being excellent in the adhesiveness to various adherends such as metal oxide, metal, resin and so on, and more particularly to an adherent resin composition of a photo-curing or electron beam-curing type comprising a difunctional urethane (metha)acrylate oligomer (A) and a monomer component (B), characterized in that the urethane (metha)acrylate oligomer includes a urethane prepolymer portion composed of a polyol and a polyisocyanate wherein repetitive number of urethane prepolymer portion (n) is 10-30, and the monomer component (B) is a cyclic monomer having a (metha)acryloyl group.

6 Claims, No Drawings

ADHERENT RESIN COMPOSITION

TECHNICAL FIELD

This invention relates to an adherent resin composition, and more particularly to a photo-curing or electron beam-curing adherent resin composition having an excellent adhesiveness to various adherends such as metal oxides, metals, resins and so on.

RELATED ART

Heretofore, thermosetting adhesives are known as an adhesive for adhering electronic parts, mechanical parts and so on. However, the thermosetting adhesive is long in the curing time, so that there is caused a problem of lowering the productivity when the parts are adhered with the thermosetting adhesive. On the contrary, there are developed photo- or electron beam-curing adhesives for the adhesion of the above parts. Inn the photo- or electron beam-curing adhesive, the adhesion is completed in a very short time by irradiation of light or electron beams, so that it is possible to improve the productivity.

For example, JP-A-2004-115757 discloses a liquid curing resin composition comprising 30-60% by weight of urethane (metha)acrylate having a number average molecular weight of 10000-40000 and 30-60% by weight of an ethylenically unsaturated monomer being not lower than 60° C. in the glass transition temperature of its homopolymer. Furthermore, it is disclosed that the liquid curing resin composition has an excellent adhesiveness to a plastic substrate but also is excellent in the heat resistance and water resistance and useful for the adhesion of various parts including vinyl chloride sheets and laminates of PET film.

DISCLOSURE OF THE INVENTION

In the current assembling of electronic parts, it is required to simultaneously adhere a metal such as gold, nickel or the like, a metal oxide such as IZO, ITO or the like, and a resin such as PET, polyimide or the like as an adherend, so that it is demanded to use adhesives being excellent in not only the adhesiveness to the specified adherend but also the adhesiveness to various adherends.

In this connection, the inventors have made examinations and confirmed that the conventional photo- or electron beam-curing adhesives including the liquid curing resin composition disclosed in JP-A-2004-115757 are poor in the adhesiveness to the metal oxide such as IZO or the like and/or the metal such as gold or the like and hence sufficient bond strength (peeling strength) is not obtained.

It is, therefore, the first object of the invention to solve the problems of the conventional techniques and to provide a photo-curing or electron beam-curing adherent resin composition being excellent in the adhesiveness to various adherends such as metal oxides, metals, resins and so on.

The inventors have made various studies for achieving the first object and found that a photo-curing or electron beam-curing adherent resin composition comprising a difunctional urethane (metha)acrylate oligomer including urethane prepolymer portion composed of polyol and polyisocyanate wherein repetitive number of the urethane prepolymer portion (n) is within a specified range (A) and a cyclic monomer having a (metha)acryloyl group is excellent in the adhesiveness to the metal oxide such as IZO or the like, the metal such as gold or the like, and the resin such as PET, polyimide or the like, and as a result, the invention has been accomplished.

That is, the adherent resin composition according to the invention is a photo-curing or electron beam-curing adherent resin composition comprising a difunctional urethane (metha)acrylate oligomer (A) and a monomer component (B), characterized in that the urethane (metha)acrylate oligomer (A) comprises a urethane prepolymer portion composed of a polyol and a polyisocyanate wherein repetitive number of the urethane prepolymer portion (n) is 10-30, and the monomer component (B) comprises a cyclic monomer having a (metha) acryloyl group.

In a preferable embodiment of the adherent resin composition of the invention, the cyclic monomer having the (metha)acryloyl group is acryloyl morpholine.

In the adherent resin composition of the invention, it is preferable that a ratio of the urethane (metha)acrylate oligomer (A) in the total amount of the urethane (metha)acrylate oligomer (A) and the monomer component (B) is 10-80 mass % and a ratio of the cyclic monomer having the (metha) acryloyl group is 20-90 mass %.

In the adherent resin composition of the invention, as the polyisocyanate are preferable a hydrogenated diphenylmethane diisocyanate and isophorone diisocyanate.

The adherent resin composition of the invention is preferable to further contain a photopolymerization initiator (C).

In another preferable embodiment of the adherent resin composition of the invention, the polyol used for the formation of the urethane prepolymer portion in the urethane (metha)acrylate oligomer is a polyether polyol. The polyether polyol is preferable to have a number average molecular weight of 200-4000.

According to the invention, there can be provided a photo-curing or electron beam-curing adherent resin composition comprising a difunctional urethane (metha)acrylate oligomer including urethane prepolymer portion composed of polyol and polyisocyanate wherein repetitive number of the urethane prepolymer portion (n) is within a specified range (A) and a cyclic monomer having a (metha)acryloyl group, and being excellent in the adhesiveness to various adherends such as metal oxide, metal, resin and so on.

Now, the adhesive material used for assembling electronic parts is required to be sufficiently high in the glass transition temperature from its use conditions. The inventors have made examination on this point and found that an adherent resin composition including a urethane (metha)acrylate oligomer synthesized by using a general polyol has yet a room for the improvement in use as an adhesive material for electronic parts because the glass transition temperature of the adherent resin after the photo- or electro beam-curing is low.

It is, therefore, the second object of the invention to provide a photo-curing or electron beam-curing adherent resin composition being excellent in the adhesiveness to the adherends such as metal oxide, metal an the like, high in the glass transition temperature after the curing and suitable as an adhesive material for electronic parts.

The inventors have made various studies for achieving the second object and found that a photo-curing or electron beam-curing adherent resin composition comprising a difunctional urethane (metha)acrylate oligomer (A) including a urethane prepolymer portion composed of a polyol derived from polycarbonate or bisphenol-A and a polyisocyanate wherein repetitive number of the urethane prepolymer portion (n) is within a specified range, and a cyclic monomer having a (metha)acryloyl group is excellent in the adhesiveness to a metal oxide such as IZO or the like and a metal such as gold or the like but also high in the glass transition temperature after the curing. That is, the invention includes the following preferable embodiments.

In a preferable embodiment of the adherent resin composition of the invention, the polyol used for the formation of the urethane prepolymer portion in the urethane (metha)acrylate oligomer (A) is a polycarbonate diol. At this moment, the polycarbonate diol is preferable to have a number average molecular weight of 500-4000. Also, the adherent resin according to the invention is formed by curing the adherent resin composition through irradiation of light or electron beam and has a glass transition temperature (Tg) of not lower than 80° C. and a peeling strength to gold and IZO of not less than 300 N/m.

In another preferable embodiment of the adherent resin composition of the invention, the polyol used for the formation of the urethane prepolymer portion in the urethane (metha)acrylate oligomer (A) is a bisphenol-A series polyol. The bisphenol-A series polyol is preferable to have a number average molecular weight of 300-3000. Also, the other adherent resin according to the invention is formed by curing the adherent resin composition through irradiation of light or electron beam and has a glass transition temperature (Tg) of not lower than 80° C., a peeling strength to IZO of not less than 300 N/m, a peeling strength to gold of not less than 300 N/m, a peeling strength to polyimide of not less than 1000 N/m and a peeling strength to PET of not less than 1500 N/m.

According to the preferable embodiments of the invention, there can be provided a photo-curing or electron beam-curing adherent resin composition comprising a difunctional urethane (metha)acrylate oligomer (A) including a urethane prepolymer portion composed of a polyol derived from the polycarbonate diol or bisphenol-A and a polyisocyanate wherein repetitive number of the urethane prepolymer portion (n) is within a specified range, and a cyclic monomer having a (metha)acryloyl group, which is excellent in the adhesiveness to a metal oxide such as IZO or the like and a metal such as gold or the like and high in the glass transition temperature after the curing and suitable as an adhesive material for electronic parts.

BEST MODE FOR CARRYING OUT THE INVENTION

The invention will be described in detail below. The adherent resin composition of the invention is a photo-curing or electron beam-curing adherent resin composition comprising a difunctional urethane (metha)acrylate oligomer (A) and a monomer component (B), characterized in that the urethane (metha)acrylate oligomer (A) includes a urethane prepolymer portion composed of a polyol and a polyisocyanate, wherein repetitive number of the urethane prepolymer portion (n) is 10-30, and the monomer component (B) comprises a cyclic monomer having a (metha)acryloyl group. Since the adherent resin composition of the invention is cured through irradiation of light or electron beam, the adhesion can be completed in a very short time but also the adhesiveness to a metal oxide such as IZO or the like, a metal such as gold or the like and a resin such as PET, polyimide or the like. Moreover, when the adherent resin composition of the invention is used, irradiation conditions of light or electron beam are not particularly limited and can be set properly.

The urethane (metha)acrylate oligomer (A) used in the adherent resin composition of the invention is difunctional and has two (metha)acryloyloxy groups ($CH_2=CHCOO-$ or $CH_2=C(CH_3)COO-$) and plural urethane bonds ($-NH-COO-$) and can be produced, for example by reacting a polyol represented by the following general formula (I):

$$HO-R^1-H \qquad (I)$$

[wherein $R^1$ is a bivalent group] with a polyisocyanate represented by the following general formula (II):

$$OCN-R^2-NCO \qquad (II)$$

[wherein $R^2$ is a bivalent group] to synthesize a urethane prepolymer represented by the following general formula (III):

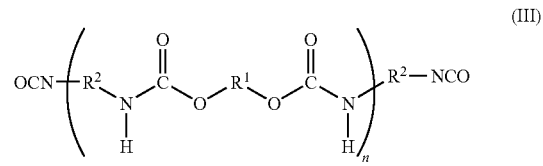

[wherein $R^1$ and $R^2$ are the same as mentioned above and n is a repetitive number of urethane prepolymer portion] and then adding to the urethane prepolymer a hydroxy group-containing (metha)acrylate represented by the following general formula (IV):

$$CH_2=C(R^4)-COO-R^3-OH \qquad (IV)$$

[wherein $R^3$ is a bivalent group and $R^4$ is hydrogen or methyl group], which can be concretely represented by the following general formula (V):

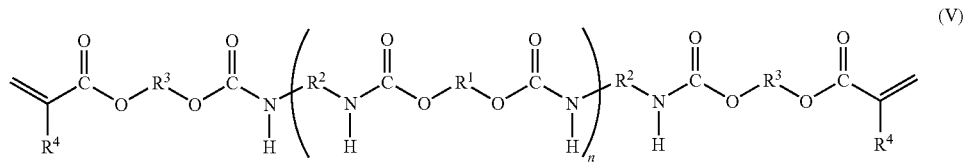

[wherein $R^1$, $R^2$, $R^3$ and $R^4$ are the same as mentioned above].

In the urethane (metha)acrylate oligomer (A) used in the adherent resin composition of the invention, the repetitive number of the urethane prepolymer portion composed of the polyol and polyisocyanate is 10-30, preferably 10-25. When the repetitive number (n) of the urethane prepolymer portion is less than 10, the adhesiveness to various adherends is low, while when it exceeds 30, the synthesis of the oligomer is difficult.

Moreover, the repetitive number (n) of the urethane prepolymer portion is an average repetitive number and can be concretely determined from a number average molecular weight (Ma) of the urethane (metha)acrylate oligomer (A), a number average molecular weight (Mb) of the polyol, a molecular weight (Mc) of the polyisocyanate and a molecular weight (Md) of the hydroxy group-containing (metha)acrylate according to the following equation:

$$n=(Ma-2\times Md-Mc)/(Mb+Mc).$$

In the invention, the number average molecular weight (Ma) of the urethane (metha)acrylate oligomer (A) is a value measured as converted to polystyrene through GPC, and the number average molecular weight (Mb) of the polyol is a value measured from a calibration curve with a monodisperse polypropylene glycol (PPG) through GPC.

The number average molecular weight of the polyol used for the synthesis of the urethane prepolymer is preferably 200-4000, more preferably 300-3500. When the number average molecular weight of the polyol used is less than 200, the gelation occurs easily in the synthesis of the prepolymer and the stable synthesis is difficult, while when it exceeds 4000, the adhesiveness is unfavorably deteriorated. As the polyol are mentioned a polyether polyol, a polycarbonate diol, a bisphenol-A series polyol and so on. The polycarbonate diol and bisphenol-A series polyol are particularly preferable from a viewpoint of improving the glass transition temperature of the adherent resin composition after the curing. The adherent resin composition comprising the urethane (metha)acrylate oligomer (A) synthesized by using the polycarbonate diol or bisphenol-A series polyol as the polyol is high in the glass transition temperature after the curing and suitable as an adhesive material for electronic parts.

The polyether polyol usable for the synthesis of the urethane prepolymer is a compound having plural ether bonds and two hydroxy groups. When the polyol is a polyether polyol, $R^1$ in the formula (I) is a bivalent group having ether bond. As the bivalent group having ether bond are mentioned, for example, a group represented by a formula of —(RO)$_m$R— [wherein R is an alkylene group such as ethylene group, propylene group, tetramethylene group or the like and m is a repetitive number of oxyalkylene unit], and so on.

As the polyether polyol are concretely mentioned polyethylene glycol, polypropylene glycol, polytetramethylene glycol, and a diol obtained by adding an alkylene oxide such as ethylene oxide, propylene oxide or the like to a bivalent alcohol such as ethylene glycol, propylene glycol, 1,3-propane diol, 1,2-butane diol, 1,3-butane diol, 1,4-butane diol, 1,5-pentane diol, 1,6-hexane diol or the like. These polyether polyols may be used alone or in a combination of two or more.

The number average molecular weight of the polyether polyol is preferably 200-4000, more preferably 300-3500. When the number average molecular weight of the polyether polyol used is less than 200, the gelation occurs easily in the synthesis of the prepolymer and the stable synthesis is difficult, while when it exceeds 4000, the adhesiveness is unfavorably deteriorated.

The polycarbonate diol usable for the synthesis of the urethane prepolymer is a compound having plural carbonate bonds (—OCOO—) and two hydroxy groups. When the polyol is a polycarbonate diol, $R^1$ in the formula (I) is a bivalent group having carbonate bond. As the bivalent group having the carbonate bond are mentioned, for example, a group represented by the formula of —(ROCOO)$_p$ROCO— [wherein R is an alkylene group such as ethylene group, propylene group, tetramethylene group or the like and p is a repetitive number of alkylene carbonate unit], and so on.

As the polycarbonate diol are mentioned those obtained by dehydrochlorination reaction between bivalent alcohol and phosgene or ester interchange reaction between bivalent alcohol and carbonate. As the bivalent alcohol are mentioned ethylene glycol, propylene glycol, 1,3-propane diol, 1,2-butane diol, 1,3-butane diol, 1,4-butane diol, 1,5-pentane diol, 3-methyl-1,5-pentane diol, 1,6-hexane diol and so on. As the carbonate are mentioned a dialkyl carbonate such as dimethyl carbonate, diethyl carbonate or the like, an alkylene carbonate such as ethylene carbonate, propylene carbonate or the like, and a diaryl carbonate such as diphenyl carbonate or the like. These polycarbonate diols may be used alone or in a combination of two or more.

The number average molecular weight of the polycarbonate diol is preferably 500-4000, more preferably 1000-3000. When the number average molecular weight of the polycarbonate diol used is not less than 500, gelation hardly occurs in the synthesis of the prepolymer and the stable synthesis is possible, while when it exceeds 4000, the adhesiveness is unfavorably deteriorated.

The bisphenol-A series polyol usable for the synthesis of the urethane prepolymer is a compound having a bisphenol-A residue and two hydroxy groups. When the polyol is a bisphenol-A series polyol, $R^1$ in the formula (I) is a bivalent group having bisphenol-A residue. As the bivalent group having bisphenol-A residue are mentioned, for example, a group represented by the following general formula (VI):

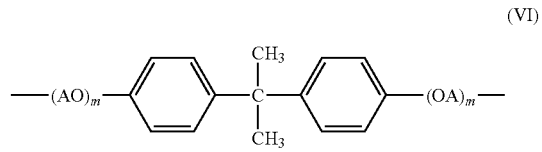

(VI)

[wherein A is an alkylene group such as ethylene group, propylene group, tetramethylene group or the like, and m is a repetitive number of oxyalkylene unit (OA)], and so on.

As the bisphenol-A series polyol are mentioned those obtained by adding an alkylene oxide such as ethylene oxide, propylene oxide, butylene oxide or the like to bisphenol-A, which may be commercially available ones. These bisphenol-A series polyols may be used alone or in a combination of two or more.

The number average molecular weight of the bisphenol-A series polyol is preferably 300-3000, more preferably 500-1000. When the number average molecular weight of the bisphenol-A series polyol used is not less than 300, gelation hardly occurs in the synthesis of the prepolymer and the stable synthesis is possible, while when it is not more than 3000, the sufficient adhesiveness is obtained.

The polyisocyanate used in the synthesis of the urethane prepolymer is a compound having two isocyanate groups. In this case, $R^2$ in the formula (II) is a bivalent group, which includes, for example, a bivalent hydrocarbon group such as an alkylene group, a cycloalkylene group, an alkylene-cycloalkylene group, a cycloalkylene-alkylene-cycloalkylene group, an arylene group, an alkylene-arylene group, an arylene-alkylene-arylene group or the like. As the alkylene group are mentioned hexamethylen group and the like; as the cycloalkylene group are mentioned cyclohexylene group, methylcyclohexylene group and the like; as the alkylene-cycloalkylene group are mentioned 3-methylene-3,5,5-trimethylcyclohexylene group and the like; as the cycloalkylene-alkylene-cycloalkylene group are mentioned cyclohexylene-methylene-cyclohexylene group and the like; as the arylene group are mentioned tolylene group and the like; as the alkylene-arylene group are mentioned methylene-phenylene group and the like; and as the arylene-alkylene-arylene group are mentioned phenylene-methylene-phenylene group and the like.

As the polyisocyanate are concretely mentioned tolylene diisocyanate (TDI), diphenylmethane diisocyanate (MDI), crude diphenylmethane diisocyanate (crude MDI), isophorone diisocyanate (IPDI), hydrogenated diphenylmethane diisocyanate (hydrogenated MDI), hydrogenated tolylene diisocyanate, hexamethylene diisocyanate (HDI) and so on. Among them, the hydrogenated diphenylmethane diisocyanate and isophorone diisocyanate are preferable. These polyisocyanates may be used alone or in a combination of two or more.

In the synthesis of the urethane prepolymer, it is preferable to use a catalyst for urethane-forming reaction. As the catalyst for urethane-forming reaction are mentioned an organotin compound, an inorganic tin compound, an organic lead compound, monoamines, diamines, triamines, cyclic amines, alcohol amines, ether amines, an organic sulphonic acid, an inorganic acid, a titanium compound, a bismuth compound, a quaternary ammonium salt and so on. Among them, the organotin compound is preferable. As the organotin compound are preferably mentioned dibutyltin dilaurate, dibutyltin diacetate, dibutyltin thiocarboxylate, dibutyltin dimaleate, dioctyltin thiocarboxylate, tin octoate, monobutyltin oxide and so on.

Also, the (metha)acrylate having the hydroxy group to be added to the urethane prepolymer is a compound one hydroxy group and one (metha)acryloyloxy group. In this case, $R^3$ in the formula (IV) is a bivalent group, which includes, for example, a bivalent hydrocarbon group such as alkylene group or the like. As the alkylene group are mentioned ethylene group, propylene group and the like. Also, $R^4$ in the formula (IV) is hydrogen or methyl group, and hydrogen is preferable.

As the hydroxy group-containing (metha)acrylate are concretely mentioned 2-hydroxyethyl (metha)acrylate, 2-hydroxypropyl (metha)acrylate and the like. These hydroxy group-containing (metha)acrylates may be used alone or in a combination of two or more.

Furthermore, the adherent resin composition of the invention comprises the monomer component (B), wherein a part or the whole of the monomer component (B) is a cyclic monomer having (metha)acryloyl group. The cyclic monomer having (metha)acryloyl group is a compound having one or more rings and one or more (metha)acryloyl groups [$CH_2$=CHCO— or $CH_2$=C($CH_3$)CO—]. As the ring are mentioned a morpholine ring, a triazine ring, isobornyl, a benzene ring and so on. Among them, a heterocycle such as morpholine ring or the like is preferable. As the cyclic monomer having (metha)acryloyl group are concretely mentioned (metha)acryloyl morpholine and so on, and acryloyl morpholine is preferable. The cyclic monomers having (metha)acryloyl group may be used alone or in a combination of two or more.

The adherent resin composition of the invention may contain a monomer other than the cyclic monomer having (metha)acryloyl group as the monomer component (B). As such a monomer is mentioned a (metha)acrylate monomer such as ethyl(metha)acrylate, isobutyl(metha)acrylate, n-butyl (metha)acrylate, isoamyl (metha)acrylate, butoxyethyl (metha)acrylate, or the like. Moreover, a ratio of the cyclic monomer having (metha)acryloyl group in the monomer component (B) is preferably not less than 60 mass %, more preferably not less than 80 mass %.

In the adherent resin composition of the invention, a ratio of the urethane (metha)acrylate oligomer (A) in the total amount of the urethane (metha)acrylate oligomer (A) and the monomer component (B) is preferably 10-80 mass %, more preferably 15-75 mass %. When the ratio of the urethane (metha)acrylate oligomer (A) is less than 10 mass %, the sufficient adhesiveness is hardly obtained, while when it exceeds 80 mass %, the viscosity becomes high and the coating property is deteriorated.

Also, the ratio of the cyclic monomer having (metha)acryloyl group in the total amount of the urethane (metha)acrylate oligomer (A) and the monomer component (B) is preferably 20-90 mass %, more preferably 25-85 mass %. When the ratio of the cyclic monomer having (metha)acryloyl group is less than 20 mass %, the viscosity is high and the coating property is deteriorated, while when it exceeds 90 mass %, the sufficient adhesiveness is not obtained.

Further, the adherent resin composition of the invention is preferable to contain a photopolymerization initiator (C). In this case, the adherent resin composition can be easily cured by irradiating a light such as ultra-violet ray or the like. The photopolymerization initiator (C) has an action of starting polymerization of the urethane (metha)acrylate oligomer (A) or the monomer component (B) by irradiating light.

As the photopolymerization initiator (C) are mentioned 4-dimethylamino benzoic acid, 4-dimethylamino benzoate, 2,2-dimethoxy-2-phenyl acetophenone, acetophenone diethyl ketal, alkoxyacetophenone, benzyldimethyl ketal, a benzophenone derivative such as benzophenone, 3,3-dimethyl-4-methoxybenzophenone, 4,4-dimethoxybenzophenone, 4,4-diaminobenzophenone or the like; alkyl benzoylbenzoate, bis(4-dialkylaminophenyl)ketone, benzyl and a benzyl derivative such as benzylmethyl ketal or the like; benzoine and a benzoine derivative such as benzoine isobutyl ether or the like; benzoine isopropyl ether, 2-hydroxy-2-methylpropiophenone, 1-hydroxycyclohexyl phenyl ketone, xanthone, thioxanthone and a thioxanthone derivative, fluorene, 2,4,6-trimethylbenzoyl diphenyl phosphine oxide, bis (2,6-dimethoxybenzoyl)-2,4,4-trimethylpentyl phosphine oxide, bis(2,4,6-trimethylbenzoyl)-phenyl phosphine oxide, 2-methyl-1-[4-(methylthio)phenyl]-2-morpholinopropane-1,2-benzyl-2-dimethylamino-1-(morpholinophenyl)-butane-1 and so on. These photopolymerization initiators (C) may be used alone or in a combination of two or more.

The amount of the photopolymerization initiator compounded is preferable to be a range of 0.1-10 parts by mass per 100 parts by mass in a total of the urethane (metha)acrylate oligomer (A) and the monomer component (B). When the amount of the photopolymerization initiator is less than 0.1 part by mass, the effect of starting the photo-curing of the adherent resin composition is small, while when it exceeds 10 parts by mass, the effect of starting the photo-curing is saturated and the material const of the adherent resin composition becomes high.

As mentioned above, the adherent resin composition of the invention is excellent in the adhesiveness to a metal oxide such as IZO or the like, a metal such as gold or the like and a resin such as PET, polyimide or the like. Therefore, the adherent resin composition of the invention can be preferably utilized to the adhesion of various adherends. More concretely, it is useful as a low temperature-curing adhesive material for electron members such as non-conductive film (NCF), anisotropically conductive film (ACF), constructional parts of electron display and so on.

Also, the adherent resin of the invention is obtained by curing the aforementioned adherent resin composition through irradiation of light or electron beam. At this moment, the irradiating conditions of the light or electron beam are not particularly limited, and may be set properly. When the polyol used in the formation of the urethane prepolymer portion of the urethane(metha)acrylate oligomer is polycarbonate diol or bisphenol-A series polyol, the resulting adherent resin of the invention has a glass transition temperature (Tg) of not lower than 80° C. and a peeling strength to gold and IZO (indium-lead oxide) of not less than 300 N/m. The adherent resin is excellent in the adhesiveness to the metal oxide such as IZO or the like and the metal such as gold or the like and high in the glass transition temperature, so that it is useful as a low temperature-curing adhesive material for various electron members such as constructional parts of electron display and the like. Moreover, if the glass transition temperature (Tg) is lower than 80° C., there is a fear of softening the cured resin considering the use environment of electron materials. Also, when the peeling strength to gold and IZO is less than 300 N/m, the adhesion force to these adherends is insufficient.

Further, when the polyol used in the formation of the urethane prepolymer portion of the urethane (metha)acrylate oligomer (A) is bisphenol-A series polyol, the resulting adherent resin of the invention has a peeling strength to polyimide of not less than 1000 N/m and a peeling strength to PET (polyethylene terephthalate) of not less than 1500 N/m in addition to the glass transition temperature (Tg) of not lower than 80° C. and the peeling strength to gold and IZO of not less than 300 N/m. This adherent resin is excellent in the adhesiveness to the metal oxide such as IZO or the like, the metal such as gold or the like and the resin such as polyimide, PET or the like and high in the glass transition temperature, so that it is useful as a low temperature-curing adhesive material for various electron members such as constructional parts of electron display and the like. Moreover, if the peeling strength to polyimide is less than 1000 N/m and the peeling strength to PET is less than 1500 N/m, the adhesion force to these adherends is insufficient.

EXAMPLES

The following examples are given in illustration of the invention and are not intended as limitations thereof.

Example 1

Into a three-necked flask of 1 liter are weighed 100.0 parts by mass of a polyether polyol obtained by polymerizing propylene glycol with propylene oxide and having a difunctionality and a number average molecular weight of 930, 25.89 parts by mass of isophorone diisocyanate (IPDI) and 0.01 part by mass of dibutyltin dilaurate (DBTDL), which are reacted at 80° C. for 4 hours while stirring to synthesize a urethane prepolymer having isocyanate groups at both terminals of its molecular chain.

Then, 3.1 parts by mass of 2-hydroxyethyl acrylate (2-HEA) is added to 100 parts by mass of the urethane prepolymer, which are reacted at 80° C. for 4 hours while stirring to synthesize a urethane acrylate oligomer (A-1). The resulting urethane acrylate oligomer (A-1) has a number average molecular weight of 17600 as measured by GPC.

Next, 60.0 parts by mass of the urethane acrylate oligomer (A-1) is mixed with 40.0 parts by mass of acryloyl morpholine (made by Shin-Nakamura Chemical Co., Ltd. "NK ESTER A-MO") and 1.0 part by mass of a photopolymerization initiator "IRGAQUAR 184D" made by Chiba Specialty Chemicals Co., Ltd. while stirring and thereafter deaerated under vacuum to prepare a UV-curing adherent resin composition.

Then, a sample for the measurement of peeling strength to the following five adherends is prepared by using the adherent resin composition:
  (1) gold-treated film
  (2) IZO-treated PET film
  (3) polyimide film
  (4) non-treated polyethylene terephthalate (PET) film
  (5) easy adhesive-treated PET film <Preparation of Sample for Measurement of Peeling Strength>

An adherend of about 18×15 cm is placed on a glass plate of about 40×40 cm and an aluminum foil of 50 μm in thickness having a central bored portion of 10×8 cm is placed thereon as a spacer. A releasing PET film is partly sandwiched to a chuck of a peel testing machine so as not to adhere a gripping margin thereof. After a small amount of the UV-curing adherent resin composition is added dropwise thereto, an easy adhesive-treated PET film of about 18×15 cm is placed. The UV-curing adherent resin composition is spread over a whole of the film face with a roller from above laminated films. The film laminate is placed on a base of about 15×15×1.5 cm so as to face the easy adhesive-treated PET film upward, and further a quartz glass of about 15×15×0.5 cm is placed on the film. The UV curing is carried out with a conveyor type UV irradiating machine. In the conveyor type irradiating machine, a conveyor speed and a sample position (distance) are adjusted so as to provide an integrating light quantity of 3000 mJ. The thus cured film is cut at a width of 25 mm so as to render the gripping margin into an end portion to thereby prepare a sample for the measurement of peeling strength.

With respect to the thus prepared sample is measured a peeling strength at a speed of 50 mm/min according to JIS K6854, wherein (1) the peeling strength is 1494 N/m when the adherend is a gold-treated film, (2) the peeling strength is 985 N/m when the adherend is an IZO-treated PET film, (3) the peeling strength is 5800 N/m when the adherend is a polyimide film, (4) the peeling strength is 1329 N/m when the adherend is a non-treated PET film, and (5) the peeling strength is 10700 N/m when the adherend is an easy adhesive-treated PET film, and as a result it is understood that the sample has a higher peeling strength to any adherends.

Also, a sample of about 80×80×1 mm is prepared from the above adherent resin composition with a conveyor type UV irradiating machine (integrating light quantity of 3000 mJ). From this plate-shaped sample is cut out a sample of about 60×10×1 mm for the measurement of glass transition temperature. The latter sample is subjected to a dynamic viscoelasticity test under conditions that a temperature rising rate is 3° C./min and a frequency is 1 Hz, and a glass transition temperature of the cured resin is measured from a peak of tan δ to be −25° C., and hence it is understood to be insufficient as an adhesive material for electronic parts because the glass transition temperature is too low.

Moreover, the repetitive number of urethane prepolymer portion (n) in the urethane acrylate oligomer (A-1) used in the UV curing adherent resin composition is calculated using the number average molecular weight of urethane acrylate oligomer of 17600, the number average molecular weight of polyether polyol of 930, the molecular weight of polyisocyanate (IPDI) of 222.28 and the molecular weight of acrylate chain (2-HEA) of 116.11, and as a result, it is (17600−2×116.11−222.28)/(930+222.28)=14.9.

Example 2

Into a three-necked flask of 1 liter are weighed 100.0 parts by mass of polyether polyol obtained by polymerization of propylene glycol and propylene oxide and being difunctional and having a number average molecular weight of 1990, 12.00 parts by mass of isophorone diisocyanate (IPDI) and 0.01 part by mass of dibutyltin dilaurate (DBTDL), which are reacted at 80° C. for 4 hours while stirring to synthesize a urethane prepolymer having isocyanate groups at both terminals of its molecular chain.

Next, 0.79 part by mass of 2-hydroxyethyl acrylate (2-HEA) is added to 100 parts by mass of the urethane prepolymer and reacted at 80° C. for 4 hours while stirring to synthesize a urethane acrylate oligomer (A-2). The number average molecular weight of the thus obtained urethane acrylate oligomer (A-2) is 33700 as measured through GPC.

Then, 60.0 parts by mass of the urethane acrylate oligomer (A-2) is mixed with 40.0 parts by mass of acryloyl morpholine (made by Shin-Nakamura Chemical Co., Ltd. "NK ESTER A-MO") and 1.0 part by mass of a photopolymerization initiator "IRGAQUAR 184D" made by Chiba Specialty Chemicals Co., Ltd. while stirring and thereafter deaerated under vacuum to prepare a UV-curing adherent resin composition.

Thereafter, a sample for the measurement of peeling strength is prepared in the same manner as in Example 1 using the above adherent resin composition to measure a peeling strength, and as a result, (1) the peeling strength is 1208 N/m when the adherend is a gold-treated film, (2) the peeling strength is 880 N/m when the adherend is an IZO-treated PET film, (3) the peeling strength is 4152 N/m when the adherend is a polyimide film, (4) the peeling strength is 3208 N/m when the adherend is a non-treated PET film, and (5) the peeling strength is 10610 N/m when the adherend is an easy adhesive-treated PET film, and as a result it is understood that the sample has a higher peeling strength to any adherends.

Moreover, the repetitive number of urethane prepolymer portion (n) in the urethane acrylate oligomer (A-2) used in the UV curing adherent resin composition is calculated using the number average molecular weight of urethane acrylate oligomer of 33700, the number average molecular weight of polyether polyol of 1990, the molecular weight of polyisocyanate (IPDI) of 222.28 and the molecular weight of acrylate chain (2-HEA) of 116.11, and as a result, it is (33700−2×116.11−222.28)/(1990+222.28)=15.0.

Example 3

Into a three-necked flask of 1 liter are weighed 100.0 parts by mass of polyether polyol obtained by polymerization of propylene glycol and propylene oxide and being difunctional and having a number average molecular weight of 1760, 14.64 parts by mass of hydrogenated diphenylmethane diisocyanate (hydrogenated MDI), 0.01 part by mass of dibutyltin dilaurate (DBTDL) and 116.0 parts by mass of acryloyl morpholine (made by Shin-Nakamura Chemical Co., Ltd. "NK ESTER A-MO"), which are reacted at 80° C. for 4 hours while stirring to synthesize a urethane prepolymer having isocyanate groups at both terminals of its molecular chain.

Next, 0.84 part by mass of 2-hydroxyethyl acrylate (2-HEA) is added to 100 parts by mass of the urethane prepolymer and reacted at 80° C. for 4 hours while stirring to synthesize a urethane acrylate oligomer (A-3). The number average molecular weight of the thus obtained urethane acrylate oligomer (A-3) is 49800 as measured through GPC.

Then, 100.0 parts by mass of the urethane acrylate oligomer (A-3) (containing 50 mass % of acryloyl morpholine) is mixed with 1.0 part by mass of a photopolymerization initiator "IRGAQUAR 184D" made by Chiba Specialty Chemicals Co., Ltd. while stirring and thereafter deaerated under vacuum to prepare a UV-curing adherent resin composition.

Thereafter, a sample for the measurement of peeling strength is prepared in the same manner as in Example 1 using the above adherent resin composition to measure a peeling strength, and as a result, (1) the peeling strength is 1872 N/m when the adherend is a gold-treated film, (2) the peeling strength is 311 N/m when the adherend is an IZO-treated PET film, (3) the peeling strength is 5646 N/m when the adherend is a polyimide film, (4) the peeling strength is 803 N/m when the adherend is a non-treated PET film, and (5) the peeling strength is 10000 N/m when the adherend is an easy adhesive-treated PET film, and as a result it is understood that the sample has a higher peeling strength to any adherends.

Moreover, the repetitive number of urethane prepolymer portion (n) in the urethane acrylate oligomer (A-3) used in the UV curing adherent resin composition is calculated using the number average molecular weight of urethane acrylate oligomer of 49800, the number average molecular weight of polyether polyol of 1760, the molecular weight of polyisocyanate (hydrogenated MDI) of 258.31 and the molecular weight of acrylate chain (2-HEA) of 116.11, and as a result, it is (49800−2×116.11−258.31)/(1760+258.31)=24.4.

Comparative Example 1

Into a three-necked flask of 1 liter are weighed 100.0 parts by mass of polyether polyol obtained by polymerization of propylene glycol and propylene oxide and being difunctional and having a number average molecular weight of 4400, 4.60 parts by mass of isophorone diisocyanate (IPDI), 0.01 part by mass of dibutyltin dilaurate (DBTDL) and 69.9 parts by mass of acryloyl morpholine (made by Shin-Nakamura Chemical Co., Ltd. "NK ESTER A-MO"), which are reacted at 80° C. for 4 hours while stirring to synthesize a urethane prepolymer having isocyanate groups at both terminals of its molecular chain.

Next, 0.25 part by mass of 2-hydroxyethyl acrylate (2-HEA) is added to 100 parts by mass of the urethane prepolymer and reacted at 80° C. for 4 hours while stirring to synthesize a urethane acrylate oligomer (A-4). The number average molecular weight of the thus obtained urethane acrylate oligomer (A-4) is 38600 as measured through GPC.

Then, 100.0 parts by mass of the urethane acrylate oligomer (A-4) (containing 40 mass % of acryloyl morpholine) is mixed with 1.0 part by mass of a photopolymerization initiator "IRGAQUAR 184D" made by Chiba Specialty Chemicals Co., Ltd. while stirring and thereafter deaerated under vacuum to prepare a UV-curing adherent resin composition.

Thereafter, a sample for the measurement of peeling strength is prepared in the same manner as in Example 1 using the above adherent resin composition to measure a peeling strength, and as a result, (1) the peeling strength is 919 N/m when the adherend is a gold-treated film, (2) the peeling strength is 201 N/m when the adherend is an IZO-treated PET film, (3) the peeling strength is 19 N/m when the adherend is a polyimide film, (4) the peeling strength is 110 N/m when the adherend is a non-treated PET film, and (5) the peeling strength is 160 N/m when the adherend is an easy adhesive-treated PET film, and as a result it is understood that the sample has a low peeling strength to any adherends.

Moreover, the repetitive number of urethane prepolymer portion (n) in the urethane acrylate oligomer (A-4) used in the UV curing adherent resin composition is calculated using the number average molecular weight of urethane acrylate oligomer of 38600, the number average molecular weight of polyether polyol of 4400, the molecular weight of polyisocyanate (IPDI) of 222.28 and the molecular weight of acrylate chain (2-HEA) of 116.11, and as a result, it is (38600−2×116.11−222.28)/(4400+222.28)=8.3.

Comparative Example 2

Into a three-necked flask of 1 liter are weighed 100.0 parts by mass of polyether polyol obtained by polymerization of propylene glycol and propylene oxide and being difunctional and having a number average molecular weight of 360, 60.8 parts by mass of isophorone diisocyanate (IPDI), 0.01 part by mass of dibutyltin dilaurate (DBTDL) and 108.6 parts by mass of acryloyl morpholine (made by Shin-Nakamura Chemical Co., Ltd. "NK ESTER A-MO"), which are reacted at 80° C. for 4 hours while stirring to synthesize a urethane prepolymer having isocyanate groups at both terminals of its molecular chain.

Next, 2.14 parts by mass of 2-hydroxyethyl acrylate (2-HEA) is added to 100 parts by mass of the urethane prepolymer and reacted at 80° C. for 4 hours while stirring to synthesize a urethane acrylate oligomer (A-5). The number average molecular weight of the thus obtained urethane acrylate oligomer (A-5) is 5200 as measured through GPC.

Then, 100.0 parts by mass of the urethane acrylate oligomer (A-5) (containing 40 mass % of acryloyl morpholine) is mixed with 1.0 part by mass of a photopolymerization initiator "IRGAQUAR 184D" made by Chiba Specialty Chemicals Co., Ltd. while stirring and thereafter deaerated under vacuum to prepare a UV-curing adherent resin composition.

Thereafter, a sample for the measurement of peeling strength is prepared in the same manner as in Example 1 using the above adherent resin composition to measure a peeling strength, and as a result, (1) the peeling strength is 43 N/m when the adherend is a gold-treated film, (2) the peeling strength is 25 N/m when the adherend is an IZO-treated PET film, (3) the peeling strength is 78 N/m when the adherend is a polyimide film, (4) the peeling strength is 266 N/m when the adherend is a non-treated PET film, and (5) the peeling strength is 430 N/m when the adherend is an easy adhesive-treated PET film, and as a result it is understood that the sample has a low peeling strength to any adherends.

Also, a sample for the measurement of glass transition temperature is prepared in the same manner as in Example 1 using the above adherent resin composition and then the glass transition temperature is measured to be 96° C., from which it is understood to have a sufficient glass transition temperature as an adhesive material for electronic parts.

Moreover, the repetitive number of urethane prepolymer portion (n) in the urethane acrylate oligomer (A-5) used in the UV curing adherent resin composition is calculated using the number average molecular weight of urethane acrylate oligomer of 5200, the number average molecular weight of polyether polyol of 360, the molecular weight of polyisocyanate (IPDI) of 222.28 and the molecular weight of acrylate chain (2-HEA) of 116.11, and as a result, it is (5200−2×116.11−222.28)/(360+222.28)=8.1.

Example 4

Into a three-necked flask of 1 liter are weighed 100.0 parts by mass of polycarbonate diol being difunctional and having a number average molecular weight of 2600 [made by Nippon Polyurethane Industry Co., Ltd. NIPPORAN 980R], 13.1 parts by mass of isophorone diisocyanate (IPDI), 0.01 part by mass of dibutyltin dilaurate (DBTDL) and 215.0 parts by mass of acryloyl morpholine (made by Shin-Nakamura Chemical Co., Ltd. "NK ESTER A-MO"), which are reacted at 80° C. for 4 hours while stirring to synthesize a urethane prepolymer having isocyanate groups at both terminals of its molecular chain.

Next, 0.3 part by mass of 2-hydroxyethyl acrylate (2-HEA) is added to 100 parts by mass of the urethane prepolymer and reacted at 80° C. for 4 hours while stirring to synthesize a urethane acrylate oligomer (A-6). The number average molecular weight of the thus obtained urethane acrylate oligomer (A-6) is 40200 as measured through GPC.

Then, 100.0 parts by mass of the urethane acrylate oligomer (A-6) (containing 65 mass % of acryloyl morpholine) is mixed with 1.0 part by mass of a photopolymerization initiator "IRGAQUAR 184D" made by Chiba Specialty Chemicals Co., Ltd. while stirring and thereafter deaerated under vacuum to prepare a UV-curing adherent resin composition.

Thereafter, a sample for the measurement of peeling strength is prepared in the same manner as in Example 1 using the above adherent resin composition to measure a peeling strength, and as a result, (1) the peeling strength is 376 N/m when the adherend is a gold-treated film, and (2) the peeling strength is 761 N/m when the adherend is an IZO-treated PET film, and as a result it is understood that the sample has a higher peeling strength to any adherends.

Also, a sample for the measurement of glass transition temperature is prepared in the same manner as in Example 1 using the above adherent resin composition and the glass transition temperature is measured to be 170° C., from which it is understood to have a sufficient glass transition temperature as an adhesive material for electronic parts.

Moreover, the repetitive number of urethane prepolymer portion (n) in the urethane acrylate oligomer (A-6) used in the UV curing adherent resin composition is calculated using the number average molecular weight of urethane acrylate oligomer of 40200, the number average molecular weight of polycarbonate diol of 2600, the molecular weight of polyisocyanate (IPDI) of 222.28 and the molecular weight of acrylate chain (2-HEA) of 116.11, and as a result, it is (40200−2×116.11−222.28)/(2600+222.28)=14.1.

Example 5

Into a three-necked flask of 1 liter are weighed 100.0 parts by mass of polycarbonate diol being difunctional and having a number average molecular weight of 1180 [made by Nippon Polyurethane Industry Co., Ltd. N-981], 30.14 parts by mass of hydrogenated diphenylmethane diisocyanate (hydrogenated MDI), 0.01 part by mass of dibutyltin dilaurate (DBTDL) and 200.0 parts by mass of acryloyl morpholine (made by Shin-Nakamura Chemical Co., Ltd. "NK ESTER A-MO"), which are reacted at 80° C. for 4 hours while stirring to synthesize a urethane prepolymer having isocyanate groups at both terminals of its molecular chain.

Next, 0.84 part by mass of 2-hydroxyethyl acrylate (2-HEA) is added to 100 parts by mass of the urethane prepolymer and reacted at 80° C. for 4 hours while stirring to synthesize a urethane acrylate oligomer (A-7). The number average molecular weight of the thus obtained urethane acrylate oligomer (A-7) is 22500 as measured through GPC.

Then, 100.0 parts by mass of the urethane acrylate oligomer (A-7) (containing 60 mass % of acryloyl morpholine) is mixed with 1.0 part by mass of a photopolymerization initiator "IRGAQUAR 184D" made by Chiba Specialty Chemicals Co., Ltd. while stirring and thereafter deaerated under vacuum to prepare a UV-curing adherent resin composition.

Thereafter, a sample for the measurement of peeling strength is prepared in the same manner as in Example 1 using the above adherent resin composition to measure a peeling strength, and as a result, (1) the peeling strength is 389 N/m when the adherend is a gold-treated film, and (2) the peeling strength is 684 N/m when the adherend is an IZO-treated PET film, and as a result it is understood that the sample has a higher peeling strength to any adherends.

Also, a sample for the measurement of glass transition temperature is prepared in the same manner as in Example 1 using the above adherent resin composition and the glass transition temperature is measured to be 172° C., from which it is understood to have a sufficient glass transition temperature as an adhesive material for electronic parts.

Moreover, the repetitive number of urethane prepolymer portion (n) in the urethane acrylate oligomer (A-7) used in the UV curing adherent resin composition is calculated using the number average molecular weight of urethane acrylate oligomer of 22500, the number average molecular weight of polycarbonate diol of 1180, the molecular weight of polyisocyanate (hydrogenated MDI) of 258.314 and the molecular weight of acrylate chain (2-HEA) of 116.11, and as a result, it is (22500−2×116.11−258.314)/(1180+258.314)=15.3.

Comparative Example 3

Into a three-necked flask of 1 liter are weighed 100.0 parts by mass of polycarbonate diol being difunctional and having a number average molecular weight of 2600 [made by Nippon Polyurethane Industry Co., Ltd. NIPPORAN 980R], 15.00 parts by mass of isophorone diisocyanate (IPDI), 0.01 part by mass of dibutyltin dilaurate (DBTDL) and 215.0 parts by mass of acryloyl morpholine (made by Shin-Nakamura Chemical Co., Ltd. "NK ESTER A-MO"), which are reacted at 80° C. for 4 hours while stirring to synthesize a urethane prepolymer having isocyanate groups at both terminals of its molecular chain.

Next, 0.84 part by mass of 2-hydroxyethyl acrylate (2-HEA) is added to 100 parts by mass of the urethane prepolymer and reacted at 80° C. for 4 hours while stirring to synthesize a urethane acrylate oligomer (A-8). The number average molecular weight of the thus obtained urethane acrylate oligomer (A-8) is 18500 as measured through GPC.

Then, 100.0 parts by mass of the urethane acrylate oligomer (A-8) (containing 65 mass % of acryloyl morpholine) is mixed with 1.0 part by mass of a photopolymerization initiator "IRGAQUAR 184D" made by Chiba Specialty Chemicals Co., Ltd. while stirring and thereafter deaerated under vacuum to prepare a UV-curing adherent resin composition.

Thereafter, a sample for the measurement of peeling strength is prepared in the same manner as in Example 1 using the above adherent resin composition to measure a peeling strength, and as a result, (1) the peeling strength is 173 N/m when the adherend is a gold-treated film, and (2) the peeling strength is 219 N/m when the adherend is an IZO-treated PET film, and as a result it is understood that the sample has a low peeling strength to any adherends.

Also, a sample for the measurement of glass transition temperature is prepared in the same manner as in Example 1 using the above adherent resin composition and the glass transition temperature is measured to be 168° C., from which it is understood to have a sufficient glass transition temperature as an adhesive material for electronic parts.

Moreover, the repetitive number of urethane prepolymer portion (n) in the urethane acrylate oligomer (A-8) used in the UV curing adherent resin composition is calculated using the number average molecular weight of urethane acrylate oligomer of 18500, the number average molecular weight of polycarbonate diol of 2600, the molecular weight of polyisocyanate (IPDI) of 222.28 and the molecular weight of acrylate chain (2-HEA) of 116.11, and as a result, it is (18500−2×116.11−222.28)/(2600+222.28)=6.4.

Example 6

Into a three-necked flask of 1 liter are weighed 100.0 parts by mass of polyether polyol formed by adding difunctional bisphenol-A having a number average molecular weight of 690 with propylene oxide (PO) [made by ADEKA Co., Ltd. BPX-55], 38.14 parts by mass of hydrogenated diphenylmethane diisocyanate (H12MDI, 4,4'-dicyclohexylmethane diisocyanate), 0.01 part by mass of dibutyltin dilaurate (DBTDL) and 140.0 parts by mass of acryloyl morpholine (made by Shin-Nakamura Chemical Co., Ltd. "NK ESTER A-MO"), which are reacted at 80° C. for 4 hours while stirring to synthesize a urethane prepolymer having isocyanate groups at both terminals of its molecular chain.

Next, 1.3 parts by mass of 2-hydroxyethyl acrylate (2-HEA) is added to 100 parts by mass of the urethane prepolymer and reacted at 80° C. for 4 hours while stirring to synthesize a urethane acrylate oligomer (A-9). The number average molecular weight of the thus obtained urethane acrylate oligomer (A-9) is 20800 as measured through GPC.

Then, 100.0 parts by mass of the urethane acrylate oligomer (A-9) (containing 50 mass % of acryloyl morpholine) is mixed with 1.0 part by mass of a photopolymerization initiator "IRGAQUAR 184D" made by Chiba Specialty Chemicals Co., Ltd. while stirring and thereafter deaerated under vacuum to prepare a UV-curing adherent resin composition.

Thereafter, a sample for the measurement of peeling strength is prepared in the same manner as in Example 1 using the above adherent resin composition to measure a peeling strength, and as a result, (1) the peeling strength is 445 N/m when the adherend is a gold-treated PET film, (2) the peeling strength is 770 N/m when the adherend is an IZO-treated PET film, (3) the peeling strength is 1506 N/m when the adherend is polyimide, and (4) the peeling strength is 1873 N/m when the adherend is non-treated PET film, and as a result it is understood that the sample has a higher peeling strength to any adherends.

Also, a sample for the measurement of glass transition temperature is prepared in the same manner as in Example 1 using the above adherent resin composition and the glass transition temperature is measured to be 153° C., from which it is understood to have a sufficient glass transition temperature as an adhesive material for electronic parts.

Moreover, the repetitive number of urethane prepolymer portion (n) in the urethane acrylate oligomer (A-9) used in the UV curing adherent resin composition is calculated using the number average molecular weight of urethane acrylate oligomer of 20800, the number average molecular weight of bisphenol-A series polyol of 690, the molecular weight of polyisocyanate (H12MDI) of 258.31 and the molecular weight of acrylate chain (2-HEA) of 116.11, and as a result, it is (20800−2×116.11−258.31)/(690+258.31)=21.4.

Example 7

Into a three-necked flask of 1 liter are weighed 100.0 parts by mass of polyether polyol formed by adding difunctional bisphenol-A having a number average molecular weight of 690 with propylene oxide (PO) [made by ADEKA Co., Ltd. BPX-55], 32.82 parts by mass of isophorone diisocyanate (IPDI), 0.01 part by mass of dibutyltin dilaurate (DBTDL) and 91.1 parts by mass of acryloyl morpholine (made by Shin-Nakamura Chemical Co., Ltd. "NK ESTER A-MO"), which are reacted at 80° C. for 4 hours while stirring to synthesize a urethane prepolymer having isocyanate groups at both terminals of its molecular chain.

Next, 2.18 parts by mass of 2-hydroxyethyl acrylate (2-HEA) is added to 100 parts by mass of the urethane prepolymer and reacted at 80° C. for 4 hours while stirring to synthesize a urethane acrylate oligomer (A-10). The number average molecular weight of the thus obtained urethane acrylate oligomer (A-10) is 15400 as measured through GPC.

Then, 100.0 parts by mass of the urethane acrylate oligomer (A-10) (containing 40 mass % of acryloyl morpholine) is mixed with 1.0 part by mass of a photopolymerization initiator "IRGAQUAR 184D" made by Chiba Specialty Chemicals Co., Ltd. while stirring and thereafter deaerated under vacuum to prepare a UV-curing adherent resin composition.

Thereafter, a sample for the measurement of peeling strength is prepared in the same manner as in Example 1 using the above adherent resin composition to measure a peeling strength, and as a result, (1) the peeling strength is 494 N/m when the adherend is a gold-treated PET film, (2) the peeling strength is 546 N/m when the adherend is an IZO-treated PET film, (3) the peeling strength is 1085 N/m when the adherend is polyimide, and (4) the peeling strength is 2265 N/m when the adherend is non-treated PET film, and as a result it is understood that the sample has a higher peeling strength to any adherends.

Also, a sample for the measurement of glass transition temperature is prepared in the same manner as in Example 1 using the above adherent resin composition and the glass transition temperature is measured to be 109° C., from which it is understood to have a sufficient glass transition temperature as an adhesive material for electronic parts.

Moreover, the repetitive number of urethane prepolymer portion (n) in the urethane acrylate oligomer (A-10) used in the UV curing adherent resin composition is calculated using the number average molecular weight of urethane acrylate oligomer of 15400, the number average molecular weight of bisphenol-A series polyol of 690, the molecular weight of polyisocyanate (IPDI) of 222.28 and the molecular weight of acrylate chain (2-HEA) of 116.11, and as a result, it is (15400−2×116.11−222.28)/(690+222.28)=16.4.

Example 8

Into a three-necked flask of 1 liter are weighed 100.0 parts by mass of polyether polyol formed by adding difunctional bisphenol-A having a number average molecular weight of 1120 with ethylene oxide (EO) [made by Sanyo Chemical Industries Ltd. NEWPOLE BPE-180], 28.74 parts by mass of hydrogenated diphenylmethane diisocyanate (H12MDI), 0.01 part by mass of dibutyltin dilaurate (DBTDL) and 130.0 parts by mass of acryloyl morpholine (made by Shin-Nakamura Chemical Co., Ltd. "NK ESTER A-MO"), which are reacted at 80° C. for 4 hours while stirring to synthesize a urethane prepolymer having isocyanate groups at both terminals of its molecular chain.

Next, 1.47 parts by mass of 2-hydroxyethyl acrylate (2-HEA) is added to 100 parts by mass of the urethane prepolymer and reacted at 80° C. for 4 hours while stirring to synthesize a urethane acrylate oligomer (A-11). The number average molecular weight of the thus obtained urethane acrylate oligomer (A-11) is 40100 as measured through GPC.

Then, 100.0 parts by mass of the urethane acrylate oligomer (A-11) (containing 50 mass % of acryloyl morpholine) is mixed with 1.0 part by mass of a photopolymerization initiator "IRGAQUAR 184D" made by Chiba Specialty Chemicals Co., Ltd. while stirring and thereafter deaerated under vacuum to prepare a UV-curing adherent resin composition.

Thereafter, a sample for the measurement of peeling strength is prepared in the same manner as in Example 1 using the above adherent resin composition to measure a peeling strength, and as a result, (1) the peeling strength is 483 N/m when the adherend is a gold-treated PET film, (2) the peeling strength is 580 N/m when the adherend is an IZO-treated PET film, (3) the peeling strength is 1344 N/m when the adherend is polyimide, and (4) the peeling strength is 1529 N/m when the adherend is non-treated PET film, and as a result it is understood that the sample has a higher peeling strength to any adherends.

Also, a sample for the measurement of glass transition temperature is prepared in the same manner as in Example 1 using the above adherent resin composition and the glass transition temperature is measured to be 139° C., from which it is understood to have a sufficient glass transition temperature as an adhesive material for electronic parts.

Moreover, the repetitive number of urethane prepolymer portion (n) in the urethane acrylate oligomer (A-11) used in the UV curing adherent resin composition is calculated using the number average molecular weight of urethane acrylate oligomer of 40100, the number average molecular weight of bisphenol-A series polyol of 1120, the molecular weight of polyisocyanate (H12MDI) of 258.31 and the molecular weight of acrylate chain (2-HEA) of 116.11, and as a result, it is (40100−2×116.11−258.31)/(1120+258.31)=28.7.

Comparative Example 4

Into a three-necked flask of 1 liter are weighed 100.0 parts by mass of polyether polyol formed by adding difunctional bisphenol-A having a number average molecular weight of 690 with propylene oxide (PO) [made by ADEKA Co., Ltd. BPX-55], 37.51 parts by mass of isophorone diisocyanate (IPDI), 0.01 part by mass of dibutyltin dilaurate (DBTDL) and 145.0 parts by mass of acryloyl morpholine (made by Shin-Nakamura Chemical Co., Ltd. "NK ESTER A-MO"), which are reacted at 80° C. for 4 hours while stirring to synthesize a urethane prepolymer having isocyanate groups at both terminals of its molecular chain.

Next, 3.46 parts by mass of 2-hydroxyethyl acrylate (2-HEA) is added to 100 parts by mass of the urethane prepolymer and reacted at 80° C. for 4 hours while stirring to synthesize a urethane acrylate oligomer (A-12). The number average molecular weight of the thus obtained urethane acrylate oligomer (A-12) is 5800 as measured through GPC.

Then, 100.0 parts by mass of the urethane acrylate oligomer (A-9) (containing 50 mass % of acryloyl morpholine) is mixed with 1.0 part by mass of a photopolymerization initiator "IRGAQUAR 184D" made by Chiba Specialty Chemicals Co., Ltd. while stirring and thereafter deaerated under vacuum to prepare a UV-curing adherent resin composition.

Thereafter, a sample for the measurement of peeling strength is prepared in the same manner as in Example 1 using the above adherent resin composition to measure a peeling strength, and as a result, (1) the peeling strength is 293 N/m when the adherend is a gold-treated PET film, (2) the peeling strength is 127 N/m when the adherend is an IZO-treated PET film, (3) the peeling strength is 794 N/m when the adherend is polyimide, and (4) the peeling strength is 621 N/m when the adherend is non-treated PET film, and as a result it is understood that the sample has a low peeling strength to any adherends.

Also, a sample for the measurement of glass transition temperature is prepared in the same manner as in Example 1 using the above adherent resin composition and the glass transition temperature is measured to be 112° C., from which it is understood to have a sufficient glass transition temperature as an adhesive material for electronic parts.

Moreover, the repetitive number of urethane prepolymer portion (n) in the urethane acrylate oligomer (A-12) used in the UV curing adherent resin composition is calculated using the number average molecular weight of urethane acrylate oligomer of 5800, the number average molecular weight of bisphenol-A series polyol of 690, the molecular weight of polyisocyanate (IPDI) of 222.28 and the molecular weight of acrylate chain (2-HEA) of 116.11, and as a result, it is (5800−2×116.11−222.28)/(690+222.28)=5.9.

<Speculation of Results>

In order to indicate the influence of the repetitive number of urethane prepolymer portion (n) in the urethane (metha)acrylate oligomer (A) used in the adherent resin composition on the adhesiveness to a metal oxide such as IZO or the like, a metal such as gold or the like and a resin such as polyimide, PET or the like, results of Examples 1-3 and Comparative Examples 1-2 are summarized in Tables 1 and 2.

In addition to the influence of the repetitive number of urethane prepolymer portion (n) in the urethane (metha)acrylate oligomer (A) used in the adherent resin composition on the adhesiveness to a metal oxide such as IZO or the like, a metal such as gold or the like and a resin such as polyimide, PET or the like, in order to indicate the influence the kind of polyol used in the formation of the urethane prepolymer portion of the urethane (metha)acrylate oligomer on the glass transition temperature of the adherent resin after the curing, results of Examples 1 and 4-5 and Comparative Examples 2-3 are also summarized in Tables 3 and 4.

Further, in addition to the influence of the repetitive number of urethane prepolymer portion (n) in the urethane (metha)acrylate oligomer (A) used in the adherent resin composition on the adhesiveness to a metal oxide such as IZO or the like, a metal such as gold or the like and a resin such as polyimide, PET or the like, in order to indicate the influence the kind of polyol used in the formation of the urethane prepolymer portion of the urethane (metha)acrylate oligomer on the glass transition temperature of the adherent resin after the curing, results of Examples 1 and 6-8 and Comparative Examples 2 and 4 are summarized in Tables 5 and 6.

As seen from the results of Tables 1 and 2, the adherent resin compositions of Examples 1-3 comprising a urethane (metha)acrylate oligomer (A) including a urethane prepolymer portion composed of a polyol and a polyisocyanate wherein repetitive number of urethane prepolymer portion (n) is 10-30, and a cyclic monomer having (metha)acryloyl group are excellent in the adhesiveness to a metal oxide such as IZO or the like, a metal such as gold or the like, and a resin such as PET, polyimide or the like.

On the other hand, the adherent resin compositions of Comparative Examples 1-2 using a urethane (metha)acrylate oligomer including a urethane prepolymer portion composed of a polyol and a polyisocyanate wherein repetitive number of urethane prepolymer portion)n) is less than 10 are inferior in the adhesiveness to various adherends as compared with the adherent resin compositions of Examples 1-3.

TABLE 1

|  |  |  |  | Example 1 | Example 2 | Example 3 | Comparative Example 1 | Comparative Example 2 |
|---|---|---|---|---|---|---|---|---|
| Synthesis of urethane acrylate oligomer | Polyol | Mn = 930 | parts by mass | 100.00 | — | — | — | — |
|  |  | Mn = 1990 |  | — | 100.00 | — | — | — |
|  |  | Mn = 1760 |  | — | — | 100.00 | — | — |
|  |  | Mn = 4400 |  | — | — | — | 100.00 | — |
|  |  | Mn = 360 |  | — | — | — | — | 100.00 |
|  | IPDI |  |  | 25.89 | 12.00 | — | 4.60 | 60.80 |
|  | hydrogenated MDI |  |  | — | — | 14.64 | — | — |
|  | DBTDL |  |  | 0.01 | 0.01 | 0.01 | 0.01 | 0.01 |
|  | AMO (diluent) |  |  | — | — | 116.00 | 69.90 | 108.63 |
|  | 2-HEA* |  |  | (3.06)* | (0.79)* | (0.84)* | (0.25)* | (2.14)* |
| Mn of polyol |  |  |  | 930 | 1990 | 1760 | 4400 | 360 |
| Mn of urethane acrylate oligomer |  |  |  | 17600 | 33700 | 49800 | 38600 | 5200 |
| Repetitive number (n) |  |  |  | 14.9 | 15.0 | 24.4 | 8.3 | 8.1 |

*Addition amount of 2-HEA parts by mass per 100 parts by mass of urethane prepolymer

TABLE 2

|  |  |  |  | Example 1 | Example 2 | Example 3 | Comparative Example 1 | Comparative Example 2 |
|---|---|---|---|---|---|---|---|---|
| Compounding recipe of adherent resin composition | urethane acrylate oligomer | (A-1) | parts by mass | 60 | — | — | — | — |
|  |  | (A-2) |  | — | 60 | — | — | — |
|  |  | (A-3) (containing 50% AMO) |  | — | — | 100 | — | — |
|  |  | (A-4) (containing 40% AMO) |  | — | — | — | 100 | — |
|  |  | (A-5) (containing 40% AMO) |  | — | — | — | — | 100 |
|  | acryloyl morpholine (AMO) |  |  | 40 | 40 | — | — | — |
|  | IRGAQUAR 184D |  |  | 1 | 1 | 1 | 1 | 1 |
| Peeling strength | gold-treated film |  | N/m | 1494 | 1208 | 1872 | 919 | 43 |
|  | IZO-treated PET film |  |  | 985 | 880 | 311 | 201 | 25 |
|  | polyimide film |  |  | 5800 | 4152 | 5646 | 19 | 78 |
|  | non-treated PET film |  |  | 1329 | 3208 | 803 | 110 | 266 |
|  | easy adhesive-treated PET film |  |  | 10700 | 10610 | 10000 | 160 | 430 |

TABLE 3

|  |  |  |  | Example 4 | Example 5 | Example 1 | Comparative Example 2 | Comparative Example 3 |
|---|---|---|---|---|---|---|---|---|
| Synthesis of urethane acrylate oligomer | polyol | polycarbonate diol (Mn = 2600) | parts by mass | 100.00 | — | — | — | 100.00 |
|  |  | polycarbonate diol (Mn = 1180) |  | — | 100.00 | — | — | — |
|  |  | polyether polyol (Mn = 930) |  | — | — | 100.00 | — | — |
|  |  | polyether polyol (Mn = 360) |  | — | — | — | 100.00 | — |
|  | IPDI |  |  | 13.10 | — | 25.89 | 60.80 | 15.00 |
|  | hydrogenated MDI |  |  | — | 30.14 | — | — | — |
|  | DBTDL |  |  | 0.01 | 0.01 | 0.01 | 0.01 | 0.01 |
|  | AMO (diluent) |  |  | 215.00 | 200.00 | — | 108.63 | 215.00 |
|  | 2-HEA* |  |  | (0.27)* | (0.84)* | (3.06)* | (2.14)* | (0.84)* |
| Mn of polyol |  |  |  | 2600 | 1180 | 930 | 360 | 2600 |
| Mn of urethane acrylate oligomer |  |  |  | 40200 | 22500 | 17600 | 5200 | 18500 |
| Repetitive number (n) |  |  |  | 14.1 | 15.3 | 14.9 | 8.1 | 6.4 |

*Addition amount of 2-HEA parts by mass per 100 parts by mass of urethane prepolymer

TABLE 4

|  |  |  |  | Example 4 | Example 5 | Example 1 | Comparative Example 2 | Comparative Example 3 |
|---|---|---|---|---|---|---|---|---|
| Compounding recipe of adherent resin composition | urethane acrylate oligomer | (A-6) (containing 65 mass % of AMO) | parts by mass | 100 | — | — | — | — |
|  |  | (A-7) (containing 60 mass % of AMO) |  | — | 100 | — | — | — |
|  |  | (A-1) |  | — | — | 60 | — | — |
|  |  | (A-5) (containing 40 mass % of AMO) |  | — | — | — | 100 | — |
|  |  | (A-8) (containing 65 mass % of AMO) |  | — | — | — | — | 100 |
|  |  | acryloyl morpholine (AMO) |  | — | — | 40 | — | — |
|  |  | IRGAQUAR 184D |  | 1 | 1 | 1 | 1 | 1 |
| Peeling strength | gold-treated film |  | N/m | 376 | 389 | 1494 | 43 | 173 |
|  | IZO-treated PET film |  |  | 761 | 684 | 985 | 25 | 219 |
| Glass transition temperature (Tg) |  |  | ° C. | 170 | 172 | −25 | 96 | 168 |

As seen from the results of Tables 3 and 4, the adherent resin compositions of Examples 4-5 comprising a urethane (metha)acrylate oligomer (A) including a urethane prepolymer portion composed of a polycarbonate diol and a polyisocyanate wherein repetitive number of urethane prepolymer portion (n) is 10-30, and a cyclic monomer having (metha)acryloyl group are excellent in the adhesiveness to a metal oxide such as IZO or the like and a metal such as gold or the like but also are high in the glass transition temperature after the curing.

On the other hand, the adherent resin composition of Example 1 using the urethane (metha)acrylate oligomer including the urethane prepolymer portion composed of the polyether polyol and polyisocyanate wherein repetitive number of urethane prepolymer portion (n) is 10-30 is excellent in the adhesiveness to the metal oxide such as IZO or the like and the metal such as gold or the like, but are low in the glass transition temperature after the curing.

Also, the adherent resin composition of Comparative Example 2 using a urethane (metha)acrylate oligomer including a urethane prepolymer portion composed of a polyether polyol and a polyisocyanate wherein repetitive number of urethane prepolymer portion (n) is less than 10 is high in the glass transition temperature after the curing but is very low in the adhesiveness to the metal oxide such as IZO or the like and the metal such as gold or the like.

Furthermore, the adherent resin composition of Comparative Example 3 using a urethane (metha)acrylate oligomer including a urethane prepolymer portion composed of a polycarbonate diol and a polyisocyanate wherein repetitive number of urethane prepolymer portion (n) is less than 10 is high in the glass transition temperature after the curing but is very low in the adhesiveness to the metal oxide such as IZO or the like and the metal such as gold or the like.

TABLE 5

|  |  |  |  | Example 6 | Example 7 | Example 8 | Example 1 | Comparative Example 2 | Comparative Example 4 |
|---|---|---|---|---|---|---|---|---|---|
| Synthesis of urethane acrylate oligomer | polyol | bisphenol-A series polyol (Mn = 690) | parts by mass | 100.00 | 100.00 | — | — | — | 100.00 |
|  |  | bisphenol-A series polyol (Mn = 1120) |  | — | — | 100.00 | — | — | — |
|  |  | polyether polyol (Mn = 930) |  | — | — | — | 100.00 | — | — |
|  |  | polyether polyol (Mn = 360) |  | — | — | — | — | 100.00 | — |

TABLE 5-continued

|  |  | Example 6 | Example 7 | Example 8 | Example 1 | Comparative Example 2 | Comparative Example 4 |
|---|---|---|---|---|---|---|---|
|  | IPDI | — | 32.82 | — | 25.89 | 60.80 | 37.51 |
|  | H12MDI | 38.14 | — | 28.74 | — | — | — |
|  | DBTDL | 0.01 | 0.01 | 0.01 | 0.01 | 0.01 | 0.01 |
|  | AMO (diluent) | 140.00 | 91.11 | 130.00 | — | 108.63 | 145.00 |
|  | 2-HEA* | (1.31)* | (2.18)* | (1.47)* | (3.06)* | (2.14)* | (3.46)* |
| Mn of polyol |  | 690 | 690 | 1120 | 930 | 360 | 690 |
| Mn of urethane acrylate oligomer |  | 20800 | 15400 | 40100 | 17600 | 5200 | 5800 |
| Repetitive number (n) |  | 21.4 | 16.4 | 28.7 | 14.9 | 8.1 | 5.9 |

*Addition amount of 2-HEA parts by mass per 100 parts by mass of urethane prepolymer

TABLE 6

|  |  |  |  | Example 6 | Example 7 | Example 8 | Example 1 | Comparative Example 2 | Comparative Example 4 |
|---|---|---|---|---|---|---|---|---|---|
| Compounding recipe of adherent resin composition | urethane acrylate oligomer | (A-9) (containing 50 mass % of AMO) | parts by mass | 100 | — | — | — | — | — |
|  |  | (A-10) (containing 40 mass % of AMO) |  | — | 100 | — | — | — | — |
|  |  | (A-11) (containing 50 mass % of AMO) |  | — | — | 100 | — | — | — |
|  |  | (A-1) |  | — | — | — | 60 | — | — |
|  |  | (A-5) (containing 40 mass % of AMO) |  | — | — | — | — | 100 | — |
|  |  | (A-12) (containing 50 mass % of AMO) |  | — | — | — | — | — | 100 |
|  |  | acryloyl morpholine (AMO) |  | — | — | — | 40 | — | — |
|  |  | IRGAQUAR 184D |  | 1 | 1 | 1 | 1 | 1 | 1 |
| Peeling strength | IZO-treated PET film |  | N/m | 770 | 546 | 580 | 985 | 25 | 127 |
|  | gold-treated film |  |  | 445 | 494 | 483 | 1494 | 43 | 293 |
|  | polyimide film |  |  | 1506 | 1085 | 1344 | 5800 | 78 | 794 |
|  | PET film |  |  | 1873 | 2265 | 1529 | 1329 | 266 | 621 |
| Glass transition temperature (Tg) |  |  | ° C. | 153 | 109 | 139 | −25 | 96 | 112 |

As seen from the results of Tables 5 and 6, the adherent resin compositions of Examples 6-8 comprising a urethane (metha)acrylate oligomer (A) including a urethane prepolymer portion composed of a bisphenol-A series polyol and a polyisocyanate wherein repetitive number of urethane prepolymer portion (n) is 10-30, and a cyclic monomer having (metha)acryloyl group are excellent in the adhesiveness to a metal oxide such as IZO or the like, a metal such as gold or the like and a resin such as polyimide, PET or the like but also are high in the glass transition temperature after the curing.

On the other hand, the adherent resin composition of Example 1 using the urethane (metha)acrylate oligomer including the urethane prepolymer portion composed of the polyether polyol and polyisocyanate wherein repetitive number of urethane prepolymer portion (n) is 10-30 is excellent in the adhesiveness to the metal oxide such as IZO or the like and the metal such as gold or the like, but are low in the glass transition temperature after the curing.

Also, the adherent resin compositions of Comparative Example 2 and 4 using a urethane (metha)acrylate oligomer including a urethane prepolymer portion composed of a polyether polyol or bisphenol-A series polyol and a polyisocyanate wherein repetitive number of urethane prepolymer portion (n) is less than 10 is high in the glass transition temperature after the curing but is very low in the adhesiveness to the metal oxide such as IZO or the like, the metal such as gold or the like and the resin such as polyimide, PET or the like.

The invention claimed is:

1. An adherent resin composition of a photo-curing or electron beam-curing type comprising a difunctional urethane (metha)acrylate oligomer (A) and a monomer component (B), characterized in that the urethane (metha)acrylate oligomer (A) includes a urethane prepolymer portion composed of a polyol and a polyisocyanate wherein repetitive number of urethane prepolymer portion (n) is 10-30, the monomer component (B) comprises acryloyl morpholine, and the polyol used in the formation of the urethane prepolymer portion of the urethane (metha)acrylate oligomer is a polycarbonate diol.

2. An adherent resin composition according to claim 1, wherein a ratio of the urethane (metha)acrylate oligomer (A) in a total amount of the urethane (metha)acrylate oligomer (A) and the monomer component (B) is 10-80 mass% and a ratio of the acryloyl morpholine is 20-90 mass%.

3. An adherent resin composition according to claim 1, wherein the polyisocyanate is a hydrogenated diphenylmethane diisocyanate or isophorone diisocyanate.

4. An adherent resin composition according to claim 1, which further contains a photopolymerization initiator (C).

5. An adherent resin composition according to claim 1, wherein the polycarbonate diol has a number average molecular weight of 500-4000.

6. An adherent resin formed by curing an adherent resin composition as claimed in claim 1 through irradiation of light or electron beam, and having a glass transition temperature (Tg) of not lower than 80° C. and a peeling strength to gold and IZO of not less than 300 N/m.

* * * * *